United States Patent [19]

Moroney

[11] 4,448,550

[45] May 15, 1984

[54] BEARING

[75] Inventor: John J. Moroney, Torrington, Conn.

[73] Assignee: The Torrington Company, Torrington, Conn.

[21] Appl. No.: 398,070

[22] Filed: Jul. 14, 1982

[51] Int. Cl.³ .................. F16C 21/00; F16C 29/04; F16C 33/30

[52] U.S. Cl. .................. 384/127; 308/6 R; 308/207 R; 74/569

[58] Field of Search .................. 384/127, 126, 128; 308/3 A, 3 R, 3.8, 6 R, 174, 208, 207 R, 219, 234; 74/569; 193/37; 29/116 R, 116 AD

[56] References Cited

U.S. PATENT DOCUMENTS

| 2,648,401 | 8/1953 | Frischmann | 308/6 R X |
| 3,148,005 | 9/1964 | Pusztay | 308/6 R |
| 3,596,533 | 8/1971 | Nightingale | 384/127 |
| 3,874,748 | 4/1975 | Figueroa | 308/3.8 X |

FOREIGN PATENT DOCUMENTS 1096237 12/1967 United Kingdom .................. 74/569

Primary Examiner—Stuart S. Levy
Assistant Examiner—Thomas R. Hannon
Attorney, Agent, or Firm—F. S. Troidl

[57] ABSTRACT

A roller bearing is provided with a plain bearing portion which rubs against a bearing support surface to provide bearing positioning thrust and location.

1 Claim, 2 Drawing Figures

U.S. Patent   May 15, 1984   4,448,550

BEARING

This invention relates to bearings. More particularly, this invention is a track roller or cam follower type roller bearing including a plain bearing surface for positioning thrust and location.

Roller bearings can support loads in only one direction. This differentiates them from other types of rolling member bearings such as ball, taper, and spherical rolling member bearings which can support complex loading systems.

Track roller or cam follower type roller bearings currently manufactured, since they support only radial loads, cannot be efficiently used where some thrust load capacity is required.

This invention provides the art with a roller bearing which has in addition to the rollers, a bearing surface which can support thrust loads.

Briefly described the new bearing has an inner race member with a raceway and an outer race member with a raceway spaced from the inner member raceway. Rollers are located in the space between the raceways. The inner race member has a bearing portion extending axially beyond the outer race member. The plain bearing portion has an end surface which rubs against a bearing support surface to provide bearing positioning thrust and location.

Figure 2:
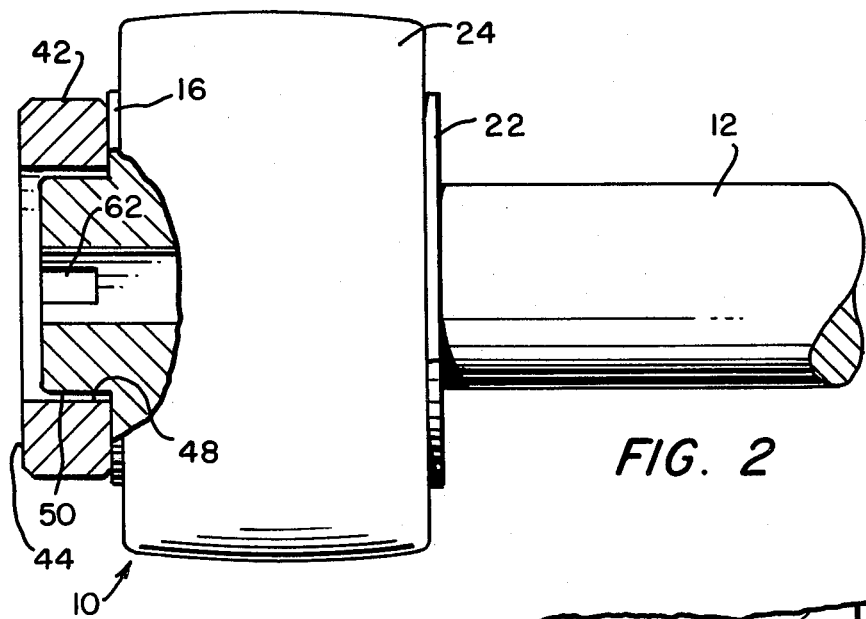
Figure 1:
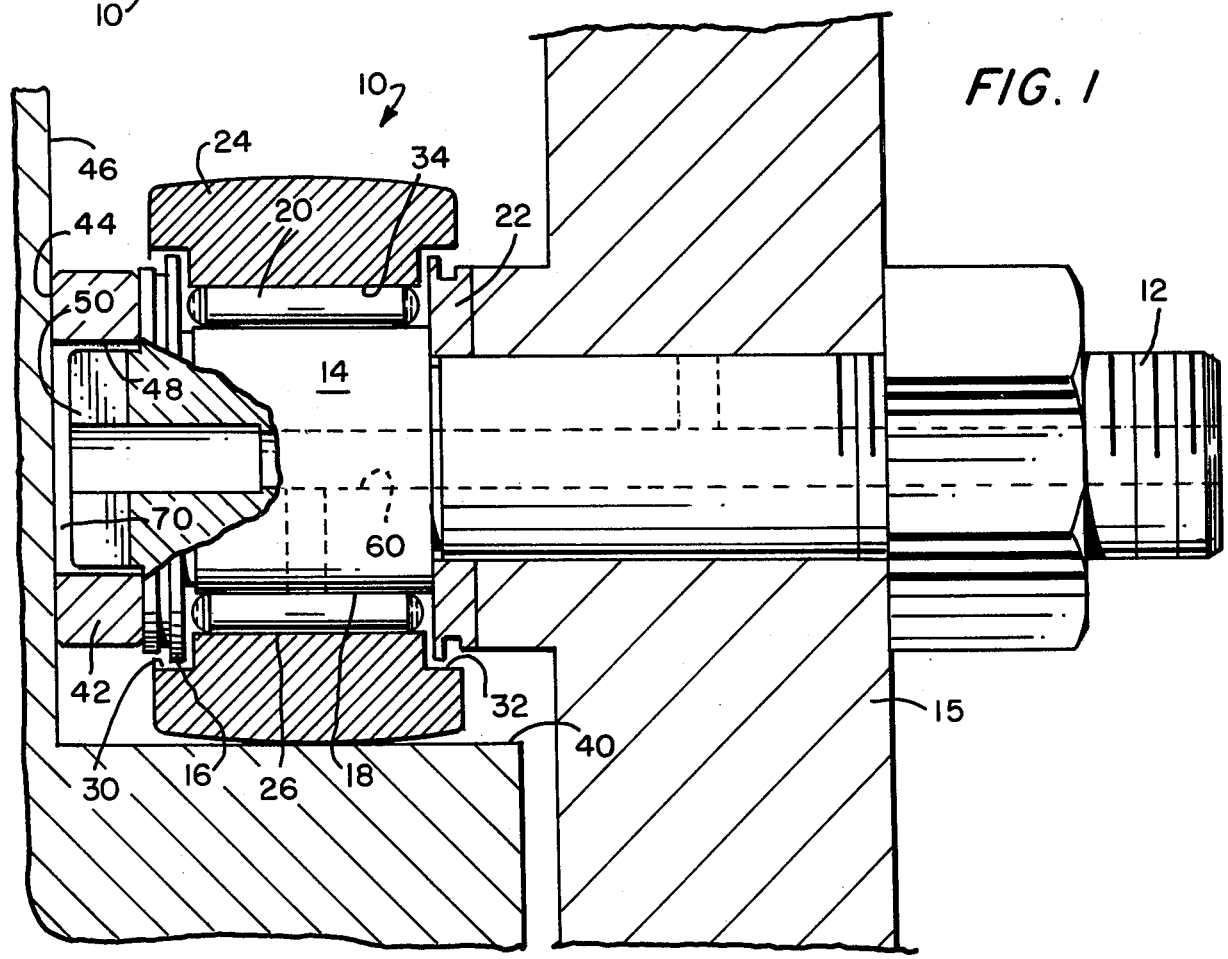

The invention as well as its many advantages may be further understood by reference to the following detailed description and drawings in which:

FIG. 1 is a side view, partly in section, showing a preferred embodiment of the bearing mounted for movement along a bearing support; and FIG. 2 is a fragmentary top view, partly in section, of the cam follower of FIG. 1.

In the various figures like parts are referred to by like numbers.

The invention to be described herein is particularly useful in a cam follower type bearing and will be described in detail with regard to its use in a cam follower. However, the system can be used in other bearing types containing rollers where thrust loads and axial positioning is desired.

Referring to the drawings, FIg. 1 shows a roller bearing cam follower 10 with a threaded portion 12 at one end of the stud or inner race 14 so that the entire bearing may be secured to a suitable arm 15 for transmitting motion. Stud 14 has an integral flange 16 at one end and adjacent this flange there is a bearing surface 18 having a reduced diameter from the outer diameter of the flange 16 and acting as the inner raceway of the bearing.

A plurality of rollers 20 are disposed about the stud 14 on the bearing surface 18. The rollers are axially kept in position by the end flange 16 and an annular end plate 22.

An outer member 24 has a bore 26 and counterbores 30 and 32 in its axial ends. The raceway 34 of the outer member 24 is positioned lengthwise between the counterbores 30 and 32 and bears upon the rollers 20.

When the arm 15 is moved, outer member 24 rotates about the relatively fixed stud 14 as the outer member rolls along platform 40 of a bearing support.

In accordance with the invention the inner race 14 has a plain bearing portion 42 extending axially beyond the outer race member 24. The end surface 44 of the plain bearing 42 rubs against the vertical bearing support surface 46. Thus, the plain bearing 42 provides bearing positioning thrust and bearing location.

Preferably, the plain bearing 42 is annular and thus is provided with a bore 48. An integral projection 50, serving as a secondary plain bearing, extends partly through the bore 48 of the annular plain bearing 42.

The usual lubrication hole 60 which may extend entirely through the stud 14 may be provided. Also, a screw driver slot 62 (see FIG. 2) is provided in the projection 50. A screwdriver is inserted into the slot to hold the stud while the nut is tightened at installation.

Since the projection 50 is shorter than the thickness of the plain bearing 42, a small axial space 70 is provided between the end of the projection and the vertical surface 46. If the plain bearing 42 wears up to the point where the end of the projection 50 contacts the surface 46, one is assured that there will still be sufficient plain bearing areas on the metal bearing cam follower to handle the necessary thrust loads until the cam follower is replaced.

I claim:

1. A cam follower-type bearing comprising: an inner race member having a flange at one end and an annular end plate at the other end with a raceway between the flange and the end plate; an outer race member with a raceway spaced from said inner member raceway to provide an annular roller space; rollers in said annular roller space axially kept in position by said flange and said end plate; said inner race member having an annular plain bearing portion extending axially beyond the outer race member and said flange; the plain bearing portion having an end surface adapted to rub against a bearing support surface to provide bearing positioning thrust and location; said inner member having a secondary plain bearing extending partially through the bore of the annular bearing portion.

* * * * *